United States Patent Office 3,370,023
Patented Feb. 20, 1968

3,370,023
CURABLE COMPOSITION COMPRISING RUBBER AND THE CO-CONDENSATION PRODUCT OF AN AROMATIC HYDROCARBON-ALDEHYDE RESIN AND A TERPENE PHENOL
Ching Yun Huang, Minoo-shi, and Kazuo Ueno, Ibaragi-shi, Japan, assignors to Japan Gas-Chemical Company, Inc., Tokyo, Japan, a corporation of Japan
No Drawing. Filed July 17, 1964, Ser. No. 383,500
Claims priority, application Japan, July 18, 1963, 38/38,788
8 Claims. (Cl. 260—3)

ABSTRACT OF THE DISCLOSURE

A curable composition comprising (1) at least one member selected from the group consisting of natural and synthetic rubbers, such as natural rubber, reclaimed rubber and diolefin polymers, (2) a cocondensation resin obtained by heating an aromatic hydrocarbon aldehyde resin together with at least one tetrafunctional terpene phenol, such as 1,8-di(4-hydroxyphenyl)-p-menthene; a mixture thereof with a bifunctional terpene phenol, such as 8-hydroxyphenyl-p-menthene-1, 2-hydroxyphenyl-p-methene-3 and the like; or a mixture of said terpene phenol with a phenol having two or more functionalities, such as phenol, cresole, xylenol, 2,2-(4,4'-dihydroxyphenol)-propane, p-tert, -butyl phenol or the like, and (3) hexamethylene tetramine. When said curable composition is vulcanized in the presence of hexamethylene tetramine at room temperature or at an elevated temperature, a set resin is formed producing an excellent reinforcing effect in the rubber.

---

This invention relates to a curable composition of rubber, resin and hexamethylene tetramine and a method for curing the same. More particularly this invention relates to a curable composition consisting of rubber, resin produced by copolycondensation of terpene phenols or a mixture thereof with polyfunctional phenol and an aromatic hydrocarbon aldehyde resin, and hexamethylene tetramine and a method of curing the same.

It has been known that thermosetting phenol resins form cross-linkages between the rubber molecules. However due to the great difference of their polarities, the compatibility of phenol resins with rubber is poor. Hence the mixing of the former does not improve the physical propties of the latter, but frequently exerts adverse effect. There have been many attempts proposed for improving the compatibility of phenol resins against rubber. A phenol resin modified by oil from cashew nut shell has been found to have fairly good solubility in rubbers. Being dispersed into rubber and cured, it can provide them with the reinforcement effect. It is now on the market as a commercial product. Even this resin does not have exactly the same polarity with rubbers and therefore in the point of compatibility cannot be considered to be satisfactory. Besides this, due to its high affinity to metals, it sticks to rolls in the mixing operation. This produces a harmful effect not only on mixing and dispersing, but also requires an extra work of cooling the rolls to remove the mixture from the rolls at the completion of mixing. This will greatly lessen operation efficiency.

Recently it has been found that an aromatic hydrocarbon aldehyde resin, which is formed by condensation reaction of aldehyde and aromatic hydrocarbon which is a solvent of rubber. However, the aromatic hydrocarbon aldehyde resin generally shows thermoplastic property. Though it performs as a plasticizer to rubber, it has no cross-linking ability against the double bonds in rubber. Hence it cannot impart reinforcement effect upon rubber.

An attempt to introduce a phenol having more than three functionalities such as phenol, m-cresol, xylenol, bisphenol or the like may be effective in providing reinforcement effect. In fact, an aromatic hydrocarbon phenol resin formed by reacting aromatic hydrocarbon and phenols shows fairly good compatibility with rubber. An attempt is made to provide a molding material with rubber like elasticity by dissolving an aromatic hydrocarbon phenol resin into rubber. This is an example of Japanese Patent No. 299,866 which has the application of above mentioned characteristic property. However since phenol, m-cresol, xylenol, bisphenol A or the like used in the manufacture of the aromatic hydrocarbon phenol resin, all have high polarity, and no compatibility with rubber even when introduced into the resin, it is insufficient in compatibility and not suitable for the enforcement of rubber.

An object of the present invention is to provide a curable composition of rubber and resin without aforementioned drawbacks. In other words it is to provide a curable composition of rubber and resin having excellent compatibility but without properties which will make it adhere to rolls during mixing. Another object of the present invention is to provide a composition consisting of rubber and resin which can be cured in a short time in the presence of hexamethylene tetramine. A further object of the present invention is to provide a composition of rubber and resin by which, when cured, reinforcement effect and improvement of heat resistance upon rubber can be achieved. Namely, it is to provide a cured rubber having excellent value of elongation, tensile strength, flexibility, hardness, modulus, and abrasion resistance. Still, a further object is to provide a method for producing such a cured rubber.

According to the present invention, a resin produced by adding terpene phenols, mixtures thereof, mixtures of terpene phenols with phenols having more than two functionalities to aromatic hydrocarbon aldehyde resin and heating to effect copolycondensation, is added to natural rubber, reclaimed rubber, or synthetic rubber to produce a mutually dissolved composition. Curing of this composition is conducted at room temperature or at an elevated temperature up to 220° C. in the presence of hexamethylene tetramine.

A raw material of copolycondensation resin used in the present invention i.e., an aromatic hydrocarbon aldehyde resin is a product obtained by heating a hydrocarbon such as benzene, toluene, durene, xylene, mesitylene, naphthalene, methyl naphthalene, anthracene or the like with an aldehyde having less than 4 carbon atoms such as formaldehyde, acetaldehyde, butylaldehyde or the like at an elevated temperature of 50°–250° C. in the presence of an acidic catalyst. It is a liquid or solid resin having at least one radical selected from the groups consisting of —CHROHRC, —CRH(OCHR)$_n$OCRH, —CRHOH (wherein R is a hydrogen atom of alkyl radical having one to four carbon atoms) and oxygen content from 3 to 18 percent by weight. It readily starts condensation reaction with terpene phenols in the absence or in the presence of an acidic catalyst such as p-toluene sulfonic-acid, m-xylene sulfonic acid, sulfonic acid at an elevated temperature of 50°–200° C.

As the other raw material for copolycondensation resins, terpene phenols having hydroxyphenyl radical which are obtained by the reaction of terpenes such as 1.8 -di(4-hydroxyphenol)-p-menthane which has 4 functionalities against aromatic hydrocarbon aldehyde resins, or 8 - hydroxyphenyl - p - menthene-1,2-hydroxyphenyl-p-menthene-3, or the like which have 2 functionalities with phenols, alone or mixtures of these terpenes having hydroxyphenyl radicals or condensation product of the aforementioned terpene phenols with formaldehyde can be useful.

When a terpene phenol having two functionalities is used in the manufacture of an aromatic hydrocarbon terpene phenol resin, it is necessary to add a phenol such as phenol, xylenol or the like in carrying out the reaction in order to provide a rubber with cross-linking ability. By the addition of more than 10 percent by weight of a terpene phenol to react with an aromatic hydrocarbon aldehyde resin, a copoly-condensation resin having such an excellent compatibility and reinforcement effect upon rubber as no aromatic hydrocarbon phenol resin has ever had.

When a terpene phenol having 4 functionalities such as 1,8-di(4-hydroxyphenyl)-p-menthane is used, it is possible to add a phenol having 2 functionalities such as p-tertiary-butylphenol, nonyl phenol or the like in carrying out the reaction.

When an excessive amount of phenol i.e., more than the equivalent amount of phenol viz the oxygen-containing radical of an aromatic hydrocarbon aldehyde resin is used and free unreacted phenol is remaining after completion of the reaction, further reaction with aldehyde is preferable. However, even when a terpene phenol is present in the free state, it does not cause any impairment of physical properties upon the cured rubber, due to its good compatibility with rubber and its low crystallinity.

Rubbers which are useful in the present invention are natural rubber, reclaimed rubber, synthetic rubber such as styrene butadiene rubber, nitrile rubber, butyl rubber, chloroprene rubber and the like. They are used alone or as a mixture of the foregoing rubber.

The preferred amount of an aromatic hydrocarbon terpene phenol resin to be incorporated with rubber is in the range of from 10 to 100 parts, preferably from 30 to 70 parts by weight per 100 parts by weight of rubber.

Incorporation of the aromatic hydrocarbon terpene phenol resin is accomplished by conventional methods using such apparatus as a roll mill, Banbury mixer, or the like. It is also accomplished by use of an organic solvent such as toluene, methyl ethyl ketone or the like.

The curing of the aforementioned composition is performed in the presence of hexamethylene tetramine at ordinary temperature or at an elevated temperature up to 220° C.

The amount of hexamethylene tetramine is from 5 to 10 parts by weight per 100 parts by weight of an aromatic hydrocarbon terpene phenol resin. Hexamethylene tetramine can be added to the resin prior to mixing with rubber, but it can be also added in the mixing apparatus while extending the mixing operation after mixing of the resin with rubber is finished. When a solvent is used for mixing it is dissolved in the solvent.

When the amount of resin to be added to rubber is relatively small, the effect of incorporation of resin to rubber can be enhanced by further addition of chemicals generally used in the working of rubber such as zinc oxide, sulfur, vulcanization accelerator, stearic acid or the like.

Rubber sheets obtained by the present curing method show excellent values of tensile strength and hardness. The value of elongation is also excellent. By conventional curing method of rubber using resin, the tensile strength of rubber can be increased as compared with a rubber cured without incorporation of resin but it has been considered natural that it results in the significant reduction of elongation and embrittlement of rubber. The effect of the present invention is all the more surprising since remarkable increase of the elongation can be attained by the present invention. These characteristic properties of cured rubber of the present invention can be utilized most efficiently in the field where highly oil resistant and highly elastic properties are required, e.g., in the gasket of oil seal. In this field of application, a nitrile rubber cured by the present invention is most suitable. Another advantage brought about by the present invention is the heat resistance of cured rubber. When a rubber cured by conventional method is used in the operation at a high temperature, e.g., as a conveyor belt which carries high temperature cokes from a coke oven, the belt becomes stiffened, produces cracks, and cannot stand long use due to deterioration which occurred in a short time. On the other hand a rubber conveyor belt cured by the present invention maintains constant soft elasticity of rubber even when exposed at a high temperature and shows strong resistance against heat degradation.

Further advantage of the present composition is that the rubber composition does not stick to rolls in the mixing operation of a rubber with an aromatic hydrocarbon terpene phenol resin. Accordingly it enables the mixing operation to proceed smoothly and improves the operation efficiency.

The present invention shows advantage also in the curing of mixture of two kinds of rubber. It has been difficult to mix natural rubber with nitrile rubber or a reclaimed rubber with nitrile rubber, or nitrile rubber with butyl rubber in the conventional rubber curing. On the contrary, in the present curing method it is possible to mix more than two kinds of rubber and to alter the mixing ratio freely. This enables the use of the characteristic properties of each rubber synergistically and produce rubber articles economically, e.g., by mixing expensive rubber with less expensive rubber.

Still further advantage can be realized in the field of adhesives. In this field incorporation of resin to rubber is accomplished by use of an organic solvent. A rubber adhesive produced by the present invention is characterized by its high torsion resistance of adhered area and absence of heat creep phenomena when compared with conventional compositions of rubber and phenol resin. Though by the conventional adhesive compositions of rubber and phenol resin on the market a considerable magnitude of creep phenomena has been considered inevitable when exposed to high temperature, the present curing method enables to prevent the creeping property. It is, therefore, now possible to send adhesives having a novel function to the market. As clearly stated above, the present invention brings about many notable effects and it can endow to rubber such properties which have been considered almost impossible by any of the conventional methods.

The reason of the remarkable effect exerted on the properties of rubber by the present invention lies in the use of a copolycondensation product between a terpene phenol and an aromatic hydrocarbon aldehyde resin. The terpene phenols have properties quite different from phenols or alkyl-substituted phenol, namely their polarity is very low and their crystallinity is small. From the point of molecular structure, terpene phenols contain in their molecule, a part of rubber molecule, i.e., dimer of isoprene, which seems to be the reason of compatibility to rubber. Combination of these terpene phenols aromatic hydrocarbon aldehyde resins which have by themselves superior compatibility to rubbers increases the compatibility to rubbers all the more. By the action of hexamethylene tetramine the resin produced by this combination seems to make cross-linkage with double bonds of rubber molecules.

In order that those skilled in the art may more fully understand the nature of my invention and the method of carrying out the following examples are given:

*Example 1*

A yellowish brown solid of copolycondensation resin having a softening point of 63° C. was obtained by heating a mixture consisting of 100 parts by weight of toluene formaldehyde resin (molecular weight 340, oxygen content 9.3% by weight), 50 parts by weight of 1,8-di(4-hydroxyphenyl) paramenthane, 50 parts by weight of 8-hydroxyphenyl-p-menthane-1, and 0.1 part by weight of p-toluene sulfonic acid at a temperature of 120° C. for 3 hours. Then 100 parts by weight of this resin was ground into powder and admixed with 10 parts by weight of hexamethylene tetramine. To 80 parts by weight of roughly kneaded nitrile rubber, 20 parts by weight of the foregoing composition was added and further 1.6 parts by weight of sulfur, 0.6 part by weight of vulcanization accelerator, 1 part by weight of stearic acid, and 5 parts by weight of zinc oxide were added. After mixing on the rolls at a temperature of 90° C., the curing was conducted at a temperature of 150° C. for 10 minutes. Another composition having the same ingredients ratio except that the above mentioned resin was replaced by a commercial phenol resin for mixing with a rubber and still another composition having the same ingredients ratio but not containing any resin were prepared and cured at the same condition. Physical properties of each cured rubber are shown in the following table.

|  | Tensile strength (kg./cm.$^2$) | Elongation at break (percent) | Hardness (Shore A) |
|---|---|---|---|
| A cured rubber according to the present invention. | 195 | 660 | 70 |
| A cured rubber containing a commercial phenol resin. | 120 | 290 | 70 |
| A cured rubber containing no resin. | 60 | 550 | 49 |

*Example 2*

To the reaction product obtained by heating a mixture consisting of 100 parts by weight of xylene formaldehyde resin (molecular weight 530, oxygen content 10.2% by weight), 20 parts by weight of 8-hydroxyphenyl-p-menthene-1, p-toluene sulfonic acid at a temperature of 100° C. for 1 hour, 50 parts by weight of 37 percent (by weight) formalin, and 1 part by weight of 10 percent (by weight) hydrochloric acid were added. The mixture was heated under reflux for further 2 hours. Concentrating the reaction mixture by dehydration, a resin having a softening point of 58° C., was obtained. 1 part by weight of this resin was ground and incorporated with 8 parts by weight of hexamethylene tetramine. This composition was further incorporated with the same amount of other ingredients as in Example 1 and subjected to curing at the same condition as in Example 1. Resultant product showed the following properties:

Tensile strength (kg./cm.$^2$) _____ 247
Elongation at break (percent) _____ 580
300% modulus _____ 132
Hardness (Shore A) _____ 74

*Example 3*

A resin having a softening point of 67° C. was obtained by heating a mixture consisting of 100 parts by weight of naphthalene formaldehyde resin (molecular weight 680, oxygen content 5.3% by weight), 100 parts by weight of 1.8-di(hydroxyphenyl)-p-menthane and 0.4 part by weight of p-toluene sulfonic acid at a temperature from 110° C. to 150° C. for 3 hours. 80 parts by weight of nitrile rubber, 20 parts by weight of reclaimed rubber, 30 parts by weight of the aforementioned resin and 1 part by weight of stearic acid were mixed on rolls heated at a temperature of 90° C. to bring each ingredient into homogeneously dissolved state. While continuing the mixing by rolls, 3 parts by weight of hexamethylene tetramine was added. Resulting rubber sheet was cured at a temperature of 150° C. for 10 minutes by which a cured rubber having the following properties was obtained:

Tensile strength (kg./cm.$^2$) _____ 200
Elongation at break (percent) _____ 550
Hardness (Shore A) _____ 74

*Example 4*

To the reaction product obtained by heating a mixture consisting of 100 parts by weight of xylene formaldehyde resin (molecular weight 730, oxygen content 5.9% by weight), 20 parts by ewight of 1,8 di(hydroxyphenyl)-p-menthane, 40 parts by weight p-tertiary butylphenol, 60 parts by weight of m-cresol, and 0.2 part by weight of p-toluene sulfonic acid at a temperature of 120° C. for 2 hours, 30 parts by weight of 30 percent (weight) formalin and 2 parts by weight of 10 percent (by weight) hydrochloric acid were added. The reaction was conducted under reflux for 2 hours. The reaction product was dehydrated in vacuum until the temperature of the content reached 140° C., by which a resin having a softening point of 86° C. was obtained. 7.5 parts by weight of hexamethylene tetramine was added to 100 parts by weight of the abovementioned resin. 30 parts by weight of ground resin and a blend prepared on the rolls in advance from 100 parts by weight of chloroprene rubber, 4 parts by weight of magnesium oxide and 5 parts by weight of zinc oxide, were dissolved in toluene to produce an adhesive composition. By use of this adhesive, a natural rubber and a polyvinyl chloride sheet were pasted together, and cured at a temperature of 135° C. for 60 minutes. The heat resisting creep measured by the torn-off length at the condition that the rubber end was fixed and the polyvinyl chloride end was pulled by the weight of 500 g. in a constant temperature vessel at a temperature of 70° C. for 60 minutes, was as follows:

Adhered surface by use of the present curing method Creep (millimeter) less than 1. Adhered surface by use of a commercial chloroprene rubber Phenolic 48.

What is claimed is:

1. A curable composition of matter comprising 100 parts by weight of rubber, from 10 to 100 parts, preferably from 30 to 70 parts weight of copolycondensation product of an aromatic hydrocarbon aldehyde resin having an oxygen content of from 3 to 18 percent by weight, containing, in its molecule, at least one radical selected from the group consisting of —CROHRC—, —CRH(OCHR)$_n$OCRH— and —CRHOH, wherein R is a hydrogen atom or an alkyl radical containing 1 to 4 carbon atoms with a member selected from the group consisting of at least one terpene phenol having 4 functionalities, a mixture thereof with a terpene phenol having 2 functionalities and a mixture of any of the aforementioned terpene phenol with a phenol having at least 2 functionalities and from 5 to 10 parts by weight of hexamethylene tetramine.

2. A curable composition of matter according to claim 1 in which the terpene phenol having 4 functionalities is 1,8-di(4-hydrophenyl)-p-menthene.

3. A curable composition of matter according to claim 1 in which the terpene phenol having 2 functionalities is 8-hydroxyphenyl-p-menthene-1.

4. A curable composition of matter according to claim 1 in which the terpene phenol having 2 functionalities is 2-hydroxyphenyl-p-menthene-3.

5. A curable composition of matter comprising 100 parts by weight of a rubber, from 10 to 100 parts preferably from 30 to 70 parts by weight of a copolycondensation product of an aromatic hydrocarbon aldehyde resin having an oxygen content of from 3 to 18 percent by weight, containing, in its molecule, at least one radical selected from the group consisting of —CRHOHRC—, —CRH(OCHR)$_n$OCRH—, and —CRHOH wherein R is a hydrogen atom or an alkyl radical containing 1 to 4 carbon atoms, with a condensation product between a terpene phenol and formaldehyde and from 5 to 10 parts by weight of hexamethylene tetramine.

6. A method for curing a composition of rubber comprising adding from 10 to 100 parts by weight of a copolycondensation product of an aromatic hydrocarbon aldehyde resin having an oxygen content of from 3 to 18 percent by weight, containing, in its molecule, at least one radical selected from the group consisting of —CRHOHRC—, —CRH(OCHR)$_n$OCRH— and —CRHOH wherein R is a hydrogen atom or an alkyl radical containing 1 to 4 carbon atoms with a member selected from the group consisting of at least one terpene phenol having 4 functionalities, a mixture thereof with a terpene phenol having 2 functionalities and a mixture of any of the aforementioned terpene phenol with a phenol having at least 2 functionalities and from 5 to 10 parts by weight of hexamethylene tetramine to 100 parts by weight of a rubber and heating the said composition at a temperature from 20° C. to 220° C.

7. A method according to claim 6 in which the copolycondensation product of an aromatic hydrocarbon aldehyde resin having an oxygen content of from 3 to 18 percent by weight containing in its molecule, at least one radical selected from the group consisting of —CRHOHRC—, —CRH(OCHR)$_n$OCRH— and —CRHOH wherein R is a hydrogen atom or an alkyl radical containing 1 to 4 carbon atoms, with a member selected from the group consisting of at least one terpene phenol having 4 functionalities, a mixture thereof with a terpene phenol having 2 functionalities and a mixture of any of the aforementioned terpene phenol with a phenol having at least 2 functionalities is carried out at a temperature from 50° C. to 200° C.

8. A curable composition consisting of (*a*) 100 parts of a rubber selected from the group consisting of natural rubber, claimed rubber, and diolefin polymers; (*b*) 10 to 100 parts of a cocondensation product of (1) an aromatic hydrocarbon aldehyde resin obtained by reacting an aromatic hydro-carbon selected from the group consisting of benzene, toluene, xylene, mesitylene, durene, naphthalene, methyl naphthalene, and anthracene with an aldehyde having not more than four carbon atoms in the presence of an acid catalyst and at least 10% by weight of (2) a member selected from the group consisting of tetrafunctional terpene phenols, mixtures of tetrafunctional terpene phenols and bifunctional terpene phenols and mixtures of said terpene phenols and phenols having at least two functionalities; and (*c*) 5–10 parts of hexamethylene tetramine.

References Cited

UNITED STATES PATENTS

| | | | |
|---|---|---|---|
| 2,242,250 | 5/1941 | Honel et al. | 260—51 |
| 2,741,651 | 4/1956 | Been et al. | 260—43 |
| 3,165,558 | 1/1965 | Imoto et al. | 260—823 |

FOREIGN PATENTS

| | | |
|---|---|---|
| 478,703 | 1/1938 | Great Britain. |

MURRAY TILLMAN, *Primary Examiner.*

SAMUEL H. BLECH, *Examiner.*

M. J. TULLY, *Assistant Examiner.*